US012688359B2

(12) United States Patent
Fenichel et al.

(10) Patent No.: US 12,688,359 B2
(45) Date of Patent: Jul. 21, 2026

(54) ADAPTIVE CODE CONSTRUCT GENERATION FOR DETECTING IDENTIFIERS IN MESSAGES

(71) Applicant: Capital One Services, LLC, McLean, VA (US)

(72) Inventors: Allison Fenichel, Brooklyn, NY (US); Brice Elder, Allen, TX (US); Aditya Pai, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 295 days.

(21) Appl. No.: 18/484,842

(22) Filed: Oct. 11, 2023

(65) Prior Publication Data

US 2025/0124225 A1 Apr. 17, 2025

(51) Int. Cl.
*G06F 40/279* (2020.01)
*G06F 40/40* (2020.01)
*H04L 51/06* (2022.01)

(52) U.S. Cl.
CPC ............ *G06F 40/279* (2020.01); *G06F 40/40* (2020.01); *H04L 51/06* (2013.01)

(58) Field of Classification Search
CPC ......... G06F 40/279; G06F 40/40; H04L 51/06
See application file for complete search history.

(56) References Cited

U.S. PATENT DOCUMENTS

| 2020/0067861 A1* | 2/2020 | Leddy ................. | G06F 21/6245 |
| 2022/0036002 A1* | 2/2022 | Sriharsha ............... | G06N 20/00 |
| 2024/0385944 A1* | 11/2024 | Vembu .................... | G06F 8/452 |

OTHER PUBLICATIONS

Vipin, N. S., and M. Abdul Nizar. "A proposal for efficient on-line spam filtering." 2014 First International Conference on Computational Systems and Communications (ICCSC). IEEE, 2014. (Year: 2024).*
Qian et al., "BERT-based text keyword extraction." Journal of Physics: Conference Series. vol. 1992. No. 4. IOP Publishing, 2021 (Year: 2021).*

* cited by examiner

*Primary Examiner* — Bhavesh M Mehta
*Assistant Examiner* — Jangwoen Lee
(74) *Attorney, Agent, or Firm* — Foley & Lardner LLP

(57) ABSTRACT

A method and related system for generating new rules and patterns to detect identifiers includes operations to obtain a first set of messages comprising a set of identifiers and determining a labeled set of messages associated with a target identifier of the set of identifiers based on detected matches between the target identifier and text extracted from the first set of messages with a first construct. The method further includes determining a characterizing value based on the labeled set of messages and determining whether the set of characterizing values satisfies a set of criteria. The operations further include performing a search for the target identifier in a database of messages to retrieve a set of matching messages based on a result indicating that the set of characterizing values satisfies the set of criteria. The operations further include generating a second construct based on the set of matching messages.

20 Claims, 3 Drawing Sheets

100

300

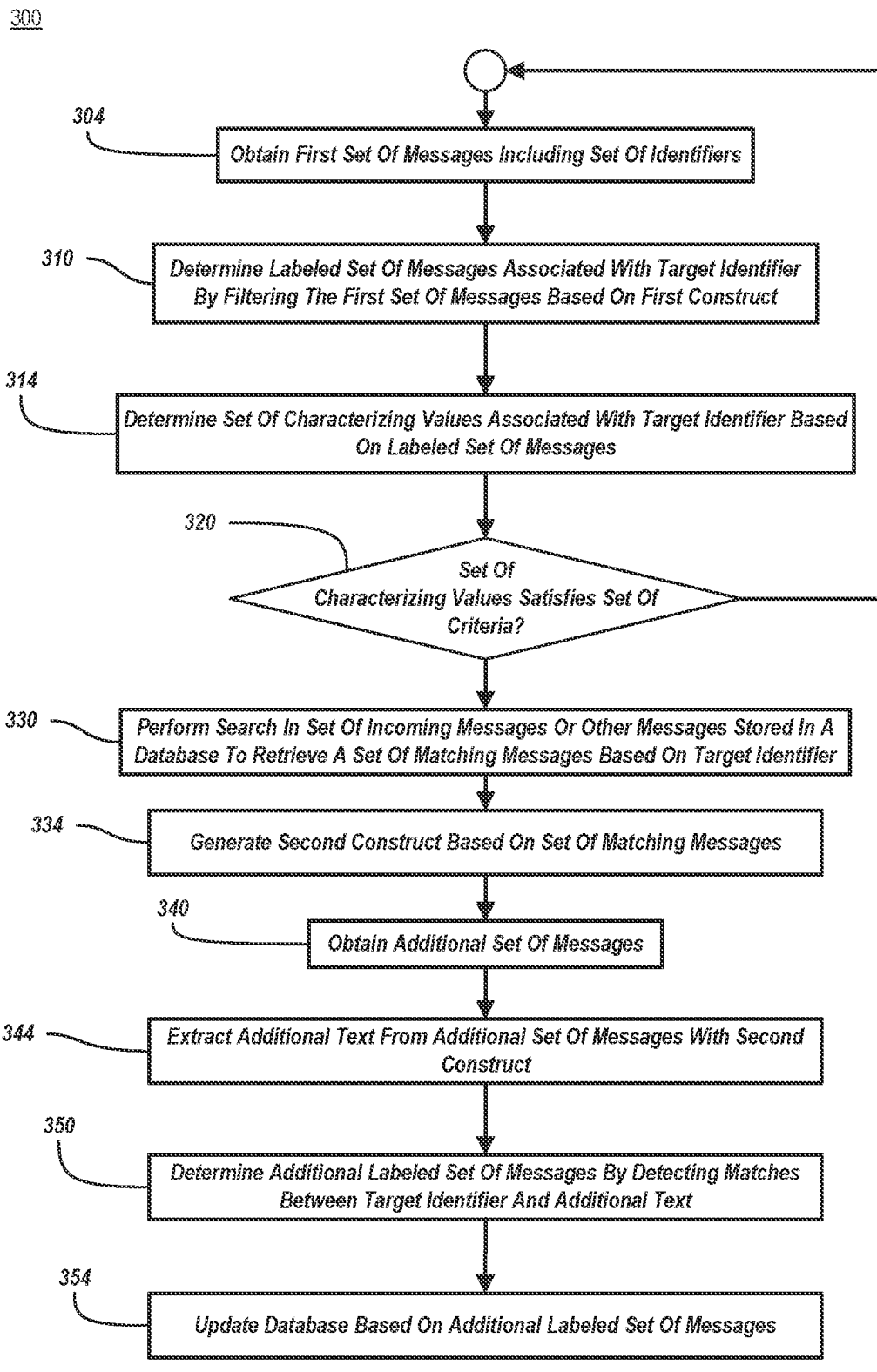

304 — Obtain First Set Of Messages Including Set Of Identifiers

310 — Determine Labeled Set Of Messages Associated With Target Identifier By Filtering The First Set Of Messages Based On First Construct 314 — Determine Set Of Characterizing Values Associated With Target Identifier Based On Labeled Set Of Messages 320 — Set Of Characterizing Values Satisfies Set Of Criteria?

330 — Perform Search In Set Of Incoming Messages Or Other Messages Stored In A Database To Retrieve A Set Of Matching Messages Based On Target Identifier 334 — Generate Second Construct Based On Set Of Matching Messages 340 — Obtain Additional Set Of Messages 344 — Extract Additional Text From Additional Set Of Messages With Second Construct 350 — Determine Additional Labeled Set Of Messages By Detecting Matches Between Target Identifier And Additional Text 354 — Update Database Based On Additional Labeled Set Of Messages

FIG. 3

ADAPTIVE CODE CONSTRUCT GENERATION FOR DETECTING IDENTIFIERS IN MESSAGES

SUMMARY

Rule-based information extraction is an important early step in message communication between different applications or even different computer systems. Such operations play a critical role in a variety of industries that require interfacing with various external entities. However, the volume of incoming messages and the possibility of non-communicated changes to those incoming messages may render stagnant, rule-based information extraction operations nonviable due to changes in the structure or a message. Furthermore, such changes in in the structure of incoming message may be sudden or unannounced, rendering a once-useful rule obsolete without any warning to a message-receiving system.

Some embodiments may overcome the technical issue described above or other issues by updating an identifier detection system based on detected changes in incoming message structure over time, where such detected changes may be based on one or more shared identifiers. Some embodiments may obtain a set of incoming messages that include identifiers corresponding with different platforms. For example, each identifier may be associated with a different platform. Some embodiments may determine a labeled set of incoming messages associated with the target identifier by filtering the set of incoming messages based on detected matches between a target identifier and text segments of the set of incoming messages as extracted by the initial construct. Some embodiments may then calculate a characterizing value associated with the target identifier, where the characterizing value may be based on a count of the labeled set of incoming messages and a count of the series of incoming messages. For example, some embodiments may determine a characterizing value as a proportion that represents a count of the labeled set of incoming messages in comparison to a count of the series of incoming messages. Some embodiments may then determine whether the characterizing value satisfies a set of criteria, such as a set of criteria that indicates that a significant change in identifier composition has occurred. This characterizing value may represent a comparison between a more recent state and a previous state, where such a comparison may indicate problems one or more rules used to extract information from messages.

The characterizing value may then be used to determine whether or not to perform additional operations related to generating or modifying a rule. Some embodiments may perform a search for the target identifier in a database of messages to retrieve a set of matching messages. For example, some embodiments may retrieve a set of matching messages in a database of messages by searching for the target identifier via a query. Some embodiments may then use the set of matching messages as an input for a language model to train the language model and use the trained language model to generate a second construct. Some embodiments may then update an additional set of messages by detecting matches between the target identifier and additional text extracted from the additional set of messages using the second construct.

Various other aspects, features, and advantages will be apparent through the detailed description of this disclosure and the drawings attached hereto. It is also to be understood that both the foregoing general description and the following detailed description are examples and not restrictive of the scope of the invention.

BRIEF DESCRIPTION OF THE DRAWINGS

Detailed descriptions of implementations of the present technology will be described and explained through the use of the accompanying drawings.

FIG. 3 is a flowchart of a process for generating rules using a language model based on detected identifiers obtained from a set of incoming messages, in accordance with one or more embodiments.

Figure 1:
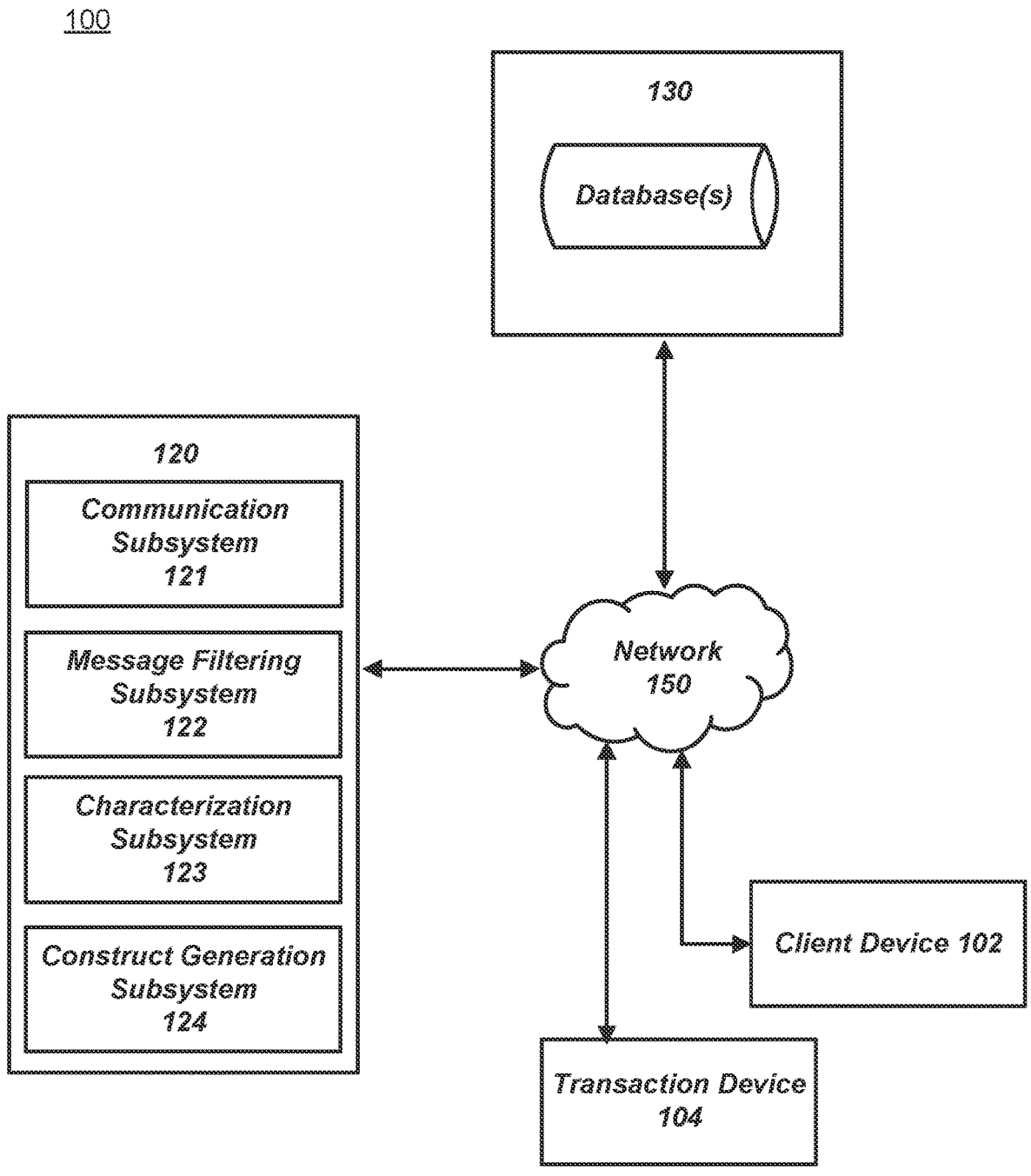
FIG. 1 illustrates an example system to activate and use a rule generation system based on detected identifiers obtained from a set of incoming messages, in accordance with some embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1 illustrates an example system to activate and use a rule generation system based on detected identifiers obtained from a set of incoming messages, in accordance with some embodiments. A system 100 includes a client device 102. The client device 102 may include computing devices such as a desktop computer, a laptop computer, a wearable headset, a smartwatch, another type of mobile computing device, a transaction device, etc. In some embodiments, the client device 102 may communicate with various other computing devices via a network 150, where the network 150 may include the internet, a local area network, a peer-to-peer network, etc. The client device 102 may send and receive messages through the network 150 to communicate with a set of servers 120, where the set of servers 120 may include a set of non-transitory storage media storing program instructions to perform one or more operations of subsystems 121-124.

While one or more operations are described herein as being performed by particular components of the system 100, those operations may be performed by other components of the system 100 in some embodiments. For example, one or more operations described in this disclosure as being performed by the set of servers 120 may instead be performed by the client device 102. Furthermore, some embodiments may communicate with an application programming interface (API) of a third-party service via the network 150 to perform various operations disclosed herein, such as determining a labeled set of incoming messages, determining a characterizing value, or generating a new code construct ("construct") using a language model. For example, some embodiments may provide a retrieved set of matching messages to a language model to generate a new construct. As used in this disclosure, a construct may include various types of code constructs, such as executable program code, configuration parameters for the program code, or a pattern such as a regular expression or some other type of text-matching pattern. For example, a construct may include the regular expression "ˆ[A-C] [a-z] [0-9]," text-related program code written in C such as "strtok( )" or some combination of a regular expression and text-related program code.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure. For example, the set of databases 130 may store training data to train a language model, model parameters used to configure a language model, incoming messages or metadata associated with the incoming messages, etc.

In some embodiments, a communication subsystem 121 may receive one or more messages from various types of information sources. The communication subsystem 121 may retrieve information such as model parameters of a language model, receive transaction information sent from the transaction device 104 or the client device 102 via the network 150, or obtain other values used or described in this disclosure. Furthermore, the communication subsystem 121 may send data to other computing devices such as the transaction device 104, APIs, or client computing devices such as the client device 102. For example, as described elsewhere in this disclosure, some embodiments may generate data to be sent to the client device 102, where this data may be sent using the communication subsystem 121. As used in this disclosure, a message or other data may be considered to be sent from a device even if the message or other data traveled through one or more intermediary devices. Such messages may include various messages provided by various types of organizations outside of the control of a message-receiving system. For example, a hospital information system may receive patient information messages sent from other hospital systems or other health-care information systems, a financial institute information system may receive transaction messages from a variety of other financial institutions or merchant platforms, etc.

In some embodiments, a message filtering subsystem 122 may perform operations to filter a set of incoming messages using one or more constructs usable as a set of rules or with a set of rules. For example, some embodiments apply a set of constructs to filter a set of incoming messages, where each message of the set of incoming messages includes at least one identifier of a set of identifiers. In some embodiments, applying a construct may include executing program code of the construct, such as program code representing instructions to segment the text content of the message, obtain a value (e.g., an identifier), or otherwise modify the text content of the message. Alternatively, or additionally, applying a construct may include detecting matches between text-matching patterns (e.g., a regular expression) and at least a portion of text content of a message. The message filtering subsystem 122 may label the incoming messages based on identifiers or other data extracted from the incoming messages and then filter the set of messages based on their associated labels to determine a labeled set of messages.

The message filtering subsystem 122 may use a first construct to determine a respective identifier for each respective message of the set of messages, where the respective identifier may represent a message source, a platform through which the message was generated or sent, or other types of information stored in a field of the message. For example, the communication subsystem 121 may obtain a message containing the text content "type|blue||ID:4fdfd4||," and the message filtering subsystem 122 may apply a filtering operation based on a regular expression "ID: [A-Za-z0-9]" representing a first construct to extract the value "ID:4fdfd4." It should be understood that other regular expressions are possible to extract other values of the text content, such as "type" or "blue." Furthermore, it should also be understood that other types of constructs or the patterns of constructs may be used that are specific to different programming languages. In some embodiments, the constructs being generated may include program instructions. For example, program instructions of a construct may include instructions to delimit text based on a character and then extract a particular element of the delimited content. Various types of program instructions that are specific to specific programming languages may be used in this fashion. For example, some embodiments may apply a construct to an incoming message "a, b, c" that involves delimiting text using the program instructions "txt.split(",") to retrieve the list '["a", "b", "c"]' and then extracting the second element of the list to provide "b" as the output from applying the construct.

Additionally, some embodiments may apply one or more other operations to process content provided to the message filtering subsystem 122, where these one or more other operations may be a result of program code or other types of instructions generated with use of a language model. For example, some embodiments may remove all the white space from some or all of the text content of a message, where a language model may generate program code to perform this function. Furthermore, some embodiments may apply operations to output of data extracted through the use of a construct. For example, after detecting the identifier "13569," the message filtering subsystem 122 may add an additional value "v1" to the detected identifier to generate "13569v1."

In some embodiments, the message filtering subsystem 122 may determine whether identifiers or other data extracted with the use of the message filtering subsystem 122 matches with one or more target identifiers or other values. In some embodiments, the message filtering subsystem 122 may access a database or other data structure storing a set of known entities with corresponding entity identifiers. The message filtering subsystem 122 may then compare the identifier associated with a message to the set of known entities to determine one or more labels to apply to the message, where a label associated with an identifier may have the same name or text content as the identifier or may be otherwise mapped to the identifier. For example, the message filtering subsystem 122 may extract a candidate value from a message, where this candidate value may then be provided to the message filtering subsystem 122.

The message filtering subsystem 122 may then compare a candidate value to identifiers stored in a set of entity identifiers. Based on a detected match between the candidate value and a known identifier of the set of entity identifiers, the message filtering subsystem 122 may select the known identifier for use as a target identifier and further select a group of messages for use as a labeled set of messages based on a determination that each message of the group of messages shares an identifier. Alternatively, or additionally, some embodiments may detect that an identifier is shared between multiple messages and add the identifier as a known identifier to a set of identifiers, where some embodiments may use the added identifier as a label. Furthermore, some embodiments may update a count of messages associated with the first known identifier and label the message with a label representing the known identifier.

In some embodiments, a characterization subsystem 123 may generate one or more characterizing values used to determine whether or not to perform additional operations described in this disclosure. Some embodiments may calculate a set of characterizing values that indicate whether a set of messages is anomalous when compared to a set of thresholds (e.g., a single threshold or a threshold boundary), where the threshold or threshold boundary may represent characterizing values within an acceptable range. Some embodiments may determine a set of characterizing values based on a count of messages, such as setting a characterizing value to be equal to a count of messages or be otherwise derived from a computation using the count of messages. For example, some embodiments may determine a characterizing value as a ratio of a first count of labeled messages received in a duration in comparison to a total number of messages received in the same duration. Some embodiments may then compare this characterizing value to a threshold representing a historical number of messages considered to be normal. For example, after receiving 100,000 incoming messages, some embodiments may then use the message filtering subsystem 122 to associate 19,000 of the incoming messages with the label "X1." Some embodiments may then compare a ratio of the incoming messages labeled with "X1" and the total number of incoming messages with a threshold to determine whether or not this computed ratio satisfies the threshold, where the ratio being less than the threshold or otherwise exceeding the threshold may be indicative of a change in the structure of an incoming message. For example, some embodiments may determine that the ratio 0.19 (19,000/100,000=0.19) is less than a threshold having the value 0.25 and, in response, determine that this ratio is anomalous. As described elsewhere, some embodiments may then perform operations caused by a determination that the characterizing value is anomalous. The structure of one or more messages related to the labeled set of messages has changed.

In some embodiments, a construct generation subsystem 124 may generate a new construct based on one or more input messages. As described elsewhere in this disclosure, some embodiments may determine that a characterizing value has satisfied a set of criteria associated with triggering construct generation operations if the characterizing value is determined to exceed a corresponding threshold. For example, in some embodiments, the characterization subsystem 123 may compute a first characterizing value equal to 0.19 and determine that this characterizing value satisfies a set of criteria associated with a threshold boundary because the threshold boundary is defined by the boundary "[0.3, 0.5]" and "0.19" is less than "0.3." Some embodiments may then perform operations to collect message content used to generate a new construct or an associated set of rules.

The construct generation subsystem 124 may perform operations to retrieve additional messages from the set of incoming messages for use in generating a new construct or an associated set of program instructions. Some embodiments may perform a search through a database or other data structure storing messages, where a query for the search may include a target identifier that was determined using one or more operations described as being performed by the message filtering subsystem 122 or another operation described in this disclosure. For example, some embodiments may first determine a set of messages associated with an extracted identifier "mediocrepurchases495.com" and use this set of messages as a set of labeled messages associated with the label "mediocrepurchases495.com." Some embodiments may then use this set of labeled messages as an input for the characterization subsystem 123 to determine a characterizing value. Some embodiments may then provide the characterizing value to the construct generation subsystem 124 and determine that the characterizing value satisfies a set of criteria associated with triggering a construct generation operation. For example, some embodiments may search through a set of messages by using a query that restricts the search to messages received within a specified duration and that include a target identifier. For example, some embodiments may search through a set of messages that were generated within one week of a pre-defined data (e.g., a current date, a user-defined date, etc.) and that include a target identifier "mediocrepurchases495.com." In some embodiments, the results of the search may return additional messages that are not part of the set of labeled messages. For example, some embodiments may obtain 50,000 messages, use the message filtering subsystem 122 to initially determine a set of labeled messages including 3,000 of the 50,000 messages, and then use the construct generation subsystem 124 to determine an additional 2,000 messages of the 50,000 messages that are not included in the set of labeled messages determined with the use of the message filtering subsystem 122.

The volume of messages that are received on a regular basis may make search operations through a database of messages for each identifier computationally expensive, even when such a search is restricted to a specific duration. By using a characterizing value to assess whether to perform such a search or whether to generate a construct based on the corresponding search results, a system may intelligently reserve such searching operations to message types that would be most likely to require new rules. This type of intelligent reservation of may increase the adaptiveness of a rule-generating system using operations described in this disclosure to unplanned changes in incoming message structure.

In some embodiments, the construct generation subsystem 124 may generate a new construct that includes a new pattern or a new set of program code used to determine an identifier based on text. For example, the construct generation subsystem 124 may provide, as an input, some or all of the additional set of messages to a language model that outputs a new pattern. Some embodiments may determine an additional 2,000 messages storing text that includes a target identifier "coyo151" by using a query that includes "coyo151" to retrieve the 2,000 messages from a database. Some embodiments may then provide the 2,000 messages to a language model, such as a large language model. As described elsewhere in this disclosure, a language model may include various types of language models, such as a language model that uses one or more neural networks. For example, the language model may include convolutional neural networks, recurrent neural networks, transformers, etc. The language model may also include sub-model components to perform preprocessing or postprocessing operations. Furthermore, some embodiments may combine different sub-models, such as by using an ensemble model.

In some embodiments, some components or all of a language model used by the construct generation subsystem 124 may have been pre-trained. For example, some embodiments may use a pre-trained language model adapted to a specific programming language, where one or more additional sets of neural network layers may be configured and otherwise used for specific message types or domains associated with messages. Furthermore, some embodiments may have pre-trained some or all of the large language model.

Some embodiments may then obtain an additional set of incoming messages, such as messages obtained after obtaining a first set of messages filtered by the message filtering subsystem 122. For example, after obtaining 50,000 messages and providing a filtered message set of the 50,000 messages to the construct generation subsystem 124 to generate a new construct, some embodiments may receive an additional set of 20,000 messages and use the new construct to filter the additional set of 20,000 messages. The additional set of 20,000 messages may be filtered to obtain an additional set of labeled messages, where a database storing the labeled set of incoming messages may then be updated with the additional set of labeled messages.

Figure 2:
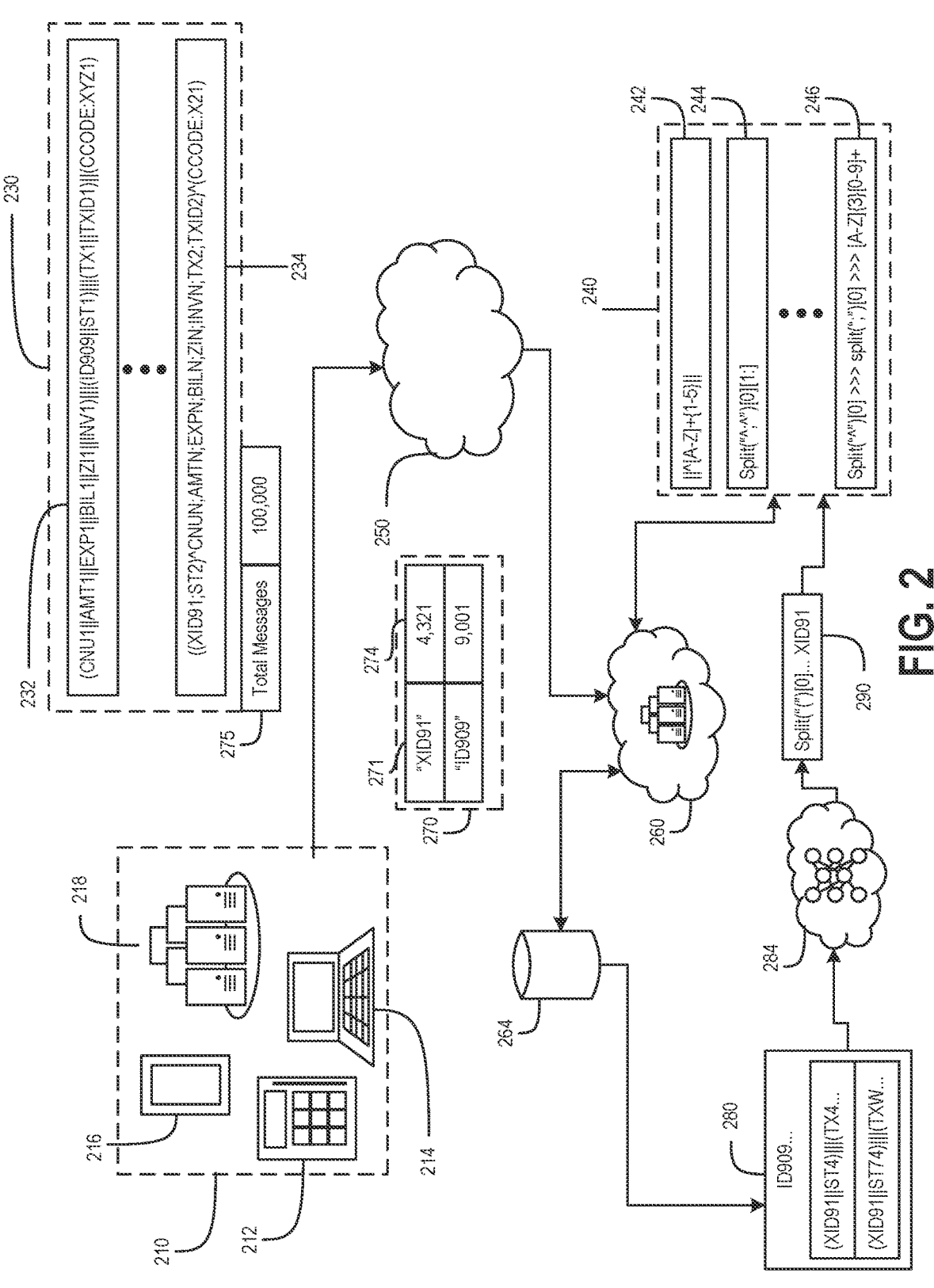
FIG. 2 illustrates an example input and output for a rule generation system, in accordance with some embodiments.

FIG. 2 illustrates an example input and output for a rule generation system, in accordance with some embodiments. A set of devices 210 including a transaction device 212, a laptop 214, a tablet 216, and a server system 218 may provide a set of messages 230. It should be understood that one or more of the devices of the set of devices 210 may send messages requiring another device of the set of devices 210 to send messages. The set of messages 230 may include a first message 232, a second message 234, and additional messages. The set of messages 230 may be communicated via a network 250 and received by a computing system 260 that may execute one or more operations described in this disclosure. It should be understood that the computing system 260 may include a cloud-based computing system, a set of on-premises servers, a distributed computing system, etc. After obtaining the set of messages 230, the computing system 260 may store these messages in a message database 264.

Some embodiments may use the computing system 260 to retrieve a set of constructs 240 and detect one or more identifiers using the set of constructs 240. The set of constructs 240 may include regular expressions, such as the regular expression shown in block 242. The set of constructs 240 may include program instructions that can be executed by the computing system 260 to extract a portion of text, such as the program code shown in block 244. The set of constructs 240 may include both program instructions and regular expressions or some other text-matching pattern, such as the combined content shown in block 246.

Some embodiments may use the set of constructs 240 to divide messages of the set of messages 230 into one or more labeled sets of messages. The computing system 260 may collect information about these labeled sets into a table 270, where a first column 271 represents target identifiers retrieved from messages that are being used as labels, and a second column 274 represents a count of messages associated with their corresponding label. For example, the table 270 indicates that 4,321 messages were detected to be associated with the target identifier "XID91" using the set of constructs 240 and that 9,001 messages were detected to be associated with the target identifier "ID909" using the set of constructs 240. The computing system 260 may retrieve a minimum count threshold associated with the target identifier "XID91," where the minimum count threshold is equal to 5,000. Alternatively, some embodiments may determine that a ratio of messages of the set of messages 230 labeled with the identifier "XID91" to the total number of messages is less than a threshold amount. As indicated by row 275, a total count of the set of messages 230 is equal to 100,000, and thus such a ratio would be equal to 0.04321. If this ratio is used as a characterizing value and a threshold corresponding to this ratio is equal to "0.05," some embodiments may determine that the characterizing value satisfies a set of criteria, where satisfaction of the set of criteria causes construct generation operations.

In some embodiments, the minimum count threshold may be obtained from a history of previous counts associated with the label "XID91." Alternatively, or additionally, ratio-related thresholds may be obtained from previously computed ratios associated with other labeled sets of messages associated with "XID91." Some embodiments may then determine that the count of messages labeled with "XID91" is less than a minimum count threshold and, in response, cause the computing system 260 to search the message database 264 with a query. The query may include the identifier "XID91" and may cause the computing system 260 to retrieve all messages of the set of messages 230 that include the identifier "XID91" as an additional set of messages 280. The computing system 260 may then provide the additional set of messages 280 to a large language model 284, which may then output a new construct represented by box 290. Some embodiments may then use the new construct represented by the box 290 to detect future messages storing the identifier "XID91" and add the construct represented by the box 290 to a data structure storing the set of constructs 240.

FIG. 3 is a flowchart of a process 300 for generating rules using a language model based on detected identifiers obtained from a set of incoming messages, in accordance with one or more embodiments. Some embodiments may obtain a first set of messages that include a set of identifiers, as indicated by block 304. In some embodiments, the first set of messages may be a series of incoming messages, where identifiers of the series of incoming messages may represent identifiers of different platforms. As will be described elsewhere, the series of incoming messages may include an identifier that matches with a target identifier, where the target identifier may be associated with a target platform, a message source, a user or another type of entity, a protocol, etc. This identifier information may be important for verifying transactions, establishing authorization, or performing other operations. For example, platform-identifying is important to the correct execution of financial transactions or technical authorization requirements.

Some embodiments may obtain a set of messages as web messages, such as web requests sent over the internet, where a request may be sent from a mobile computing device (e.g., a smartphone or tablet), a laptop, a desktop computer, or a set of servers. Alternatively, or additionally, some embodiments may obtain messages via a private network or an internal computing network, such as a database of previously received messages. Furthermore, some embodiments may obtain messages from transaction devices, such as card reader devices or other payment devices.

Some embodiments may determine a labeled set of messages associated with a target identifier by filtering the first set of messages based on a first construct, as indicated by block 310. Some embodiments may determine the labeled set of messages by filtering an obtained set of messages with a pattern retrieved from a set of constructs or executing program code of the set of constructs. For example, after obtaining a series of incoming messages from a set of remote devices, some embodiments may then filter the series of incoming messages with an initial construct or multiple initial constructs to extract text segments representing identifiers or other data. Some embodiments may extract a set of text segments from the first set of messages using the construct and detect matches between the target identifier and the set of text segments. For example, some embodiments may detect matches between a target identifier "ALPHA431" and text segments of the series of incoming messages extracted with the initial construct to determine a labeled set of incoming messages associated with the target identifier "ALPHA431."

Some embodiments may use multiple constructs when detecting identifiers based on message text content. For example, some embodiments may apply a plurality of constructs to a set of messages to extract an identifier based on detecting a set of matching text, where each matching text is equivalent to the identifier. In some embodiments, each pattern of the plurality of constructs may be used to provide a different text portion of a same message. Some embodiments may be configured to retrieve the plurality of constructs from a list of constructs. By using multiple constructs per message, some embodiments may account for variations in message structure associated with different entities or even for differences in message structure of messages associated with the same entity.

Some embodiments may use additional constructs to analyze a candidate message, where satisfying at least one of the constructs to obtain an identifier is sufficient to label the candidate message with the identifier or otherwise associate the transaction with the identifier. For example, some embodiments may receive a candidate message and apply a first construct and a second construct to the candidate message. In some embodiments, applying the first construct to the candidate message may yield no detected identifiers, while applying the second construct to the candidate message may yield a detected identifier. Some embodiments may then update a labeled set of messages associated with an identifier to include the candidate message in response to a determination that applying the second construct to the candidate message indicates that the candidate message includes the identifier.

Some embodiments may determine a set of characterizing values associated with the target identifier based on the labeled set of messages, as indicated by block 314. Some embodiments may use a count of the labeled set of messages as a characterizing value. Alternatively, or additionally, some embodiments may determine a characterizing value based on a ratio involving a count of the labeled set of messages. For example, some embodiments calculate a characterizing value as a ratio of the count of the labeled set of messages and a count of a set of incoming messages. Furthermore, various other types of values or function outputs based on a count of messages or message content may be used in a set of characterizing values.

Some embodiments may use a threshold based on other content of a message or messages. Various information in the content of messages may be used to determine a characterizing value or a value for a threshold. For example, some embodiments may determine a threshold based on a total spending amount associated with an identifier as indicated by messages within a duration. In some embodiments, a set of incoming messages may represent transaction information, where each message of the incoming messages includes one or more quantitative values representing one or more transaction amounts (e.g., a purchase, a loan amount, a payment amount, etc.). Some embodiments may then determine a labeled set of messages using operations described in this disclosure, such as operations described for block 310. Some embodiments may then determine a summation of the quantitative values representing transaction amounts of the labeled set of messages, where the summation may represent a total transaction amount associated with the shared identifier of the labeled set of messages. For example, if there are three total messages in the labeled set of messages associated with the identifier "Countcorporated135," where a first message includes a transaction amount equal to "3,000," a second message includes a transaction amount equal to "20,000," and a third message includes a transaction amount equal to "100,000," some embodiments may determine the summation "123,000" as a characterizing value associated with the identifier "Countcorporated135." Some embodiments may then use the calculated summation as a characterizing value associated with the value.

Some embodiments may determine a rate of change and use the rate of change as a characterizing value. For example, some embodiments may determine a rate of change in a count of a labeled set of messages as a per-hour rate, where a rate threshold may be determined based on a historic set of rates. For example, some embodiments may determine a rate threshold equal to 1,000 messages per day such that, if a system receives 10,000 messages associated with a label on a first day and then receives 8,999 messages associated with the label on the next day, some embodiments may determine that a set of triggering criteria is satisfied.

Some embodiments may determine whether the set of characterizing values satisfies a set of criteria, as indicated by block 320. In some embodiments, satisfaction of the set of criteria may indicate an anomaly, such as indicating a significant change in identifier composition of the set of received messages. For example, some embodiments may determine, as a characterizing value for a set of messages, 0.04 in association with the target identifier "bluered92." Some embodiments may then compare this characterizing value to a threshold boundary associated with the target identifier "bluered92" represented by the range "[0.3, 0.5]." Some embodiments may determine that 0.04 is less than 0.3 and, in response, determine that a characterizing value satisfies the set of criteria.

Some embodiments may determine multiple characterizing values. For example, some embodiments may determine a first characterizing value equal to a count of labeled messages and a second characterizing value equal to a ratio of the count of labeled messages to the count of total incoming messages from which the count of labeled messages was determined. Some embodiments may determine that the set of criteria is satisfied if at least one of the multiple characterizing values satisfies its respective threshold. For example, some embodiments may determine that a first characterizing value satisfies a first threshold equal to 1,000 by being less than 1,000 and that a second characterizing value does not satisfy a second threshold equal to 0.39 by being greater than 0.39 and, in response, proceed to operations described for block 330.

Some embodiments may determine multiple thresholds or vary the thresholds used based on characterizing values derived from previously calculated datasets. For example, after determining a target identifier, some embodiments may retrieve a dataset of previous characterizing values associated with the target identifier. Some embodiments may then determine a threshold boundary that represents a range of characterizing values based on the dataset of previous characterizing values. For example, some embodiments may determine a different characterizing value (e.g., a ratio of a first count of messages labeled with a target identifier received within a duration to a second count of all messages received within that duration) for each day. Some embodiments may set the values of the threshold boundary as the maximum and minimum values of the plurality of characterizing values such that satisfying a set of criteria based on a characterizing value comprises determining that the characterizing value is greater than the maximum value or less than the minimum value. Some embodiments may also modify a threshold value with an additional defined tolerance, such as a percentage tolerance or absolute value tolerance (e.g., increase or decrease a threshold value by 10%). Alternatively, or additionally, some embodiments may determine one or more threshold values to be satisfied, where determining whether the characterizing value satisfies the set of criteria comprises determining whether the characterizing value is within the range of characterizing values.

As described elsewhere in this disclosure, various information in the content of messages may be used to determine a threshold. For example, some embodiments may obtain a first, second, and third set of messages corresponding with different time periods, where different messages of each of the first, second, and third set of messages include one or more transaction amounts. Some embodiments may then determine a first summation based on the first set of messages, a second summation based on the second set of messages, and a third summation based on the third set of messages using operations similar to or the same as those described for block 314. Some embodiments may then determine a threshold boundary based on the three summations, such as by using a maximum and minimum value based on the summations.

As described elsewhere, based on a determination that the set of characterizing values satisfies the set of criteria, operations of the process 300 may proceed to operations described for block 330. Otherwise, operations of the process 300 may return to operations described for block 304 after obtaining another batch of messages.

Some embodiments may perform a search in the set of incoming messages or other messages stored in a database to retrieve a set of matching messages based on the target identifier, as indicated by block 330. As described elsewhere, a characterizing value associated with a target identifier may indicate that the structure of incoming messages associated with the target identifier has been changed. Some embodiments may perform a search through a set of incoming messages to obtain the target identifier for use as inputs to a language model. For example, if a target identifier is "94441z," some embodiments may generate a SQL query for a SQL database used to store the set of incoming messages to search all messages in a set of incoming messages for the value "94441z." Some embodiments may then use the search results as inputs for a language model, as indicated elsewhere in this disclosure.

Some embodiments may further update information associated with an entity identified by a target identifier. For example, some embodiments may detect that a new construct was generated based on a set of messages that share the identifier "BLURGAUSS." Some embodiments may then generate a query that includes the identifier "BLURGAUSS" to search a database of entity records to find an entity record identified by or otherwise associated with "BLURGAUSS." An entity record may be a record that includes information about an entity such as a user, a merchant platform representing a merchant group of merchants, or other discrete entity. For example, some embodiments may send a query to a database of merchant platforms to update a record identified by the entity name "BLURGAUSS." Alternatively, or additionally, some embodiments may update a database based on a query by adding a new record to the database. For example, some embodiments may add a new entity record having an entity identifier "BLURGAUSS" to the database of entity records based on a determination that no existing record of the database of entity records includes an entity record having the identifier "BLURGAUSS."

Some embodiments may generate a second construct for data extraction based on the set of matching messages, as indicated by block 334. Some embodiments may generate a new construct by providing a language model with some or all of the set of matching messages as inputs. For example, after retrieving a set of 30,000 messages that include the target identifier "ColoradoRiver," some embodiments may provide some or all of the set of 30,000 messages to a language model as inputs.

Some embodiments may determine a set of feature values associated with a target identifier to generate a pattern. Some embodiments may determine a set of feature values based on the labeled set of messages by, for each respective message of a labeled set of messages, determining a respective set of feature values. For example, some embodiments may determine three feature values for each message of a group of 10,000 messages. A feature value of a message may include various types of information characterizing a message, such as information related to the content of the message or metadata associated with the message. For example, some embodiments may determine a number of fields based on different delimiters, determine a most common character, determine a text content length of a message, etc.

Some embodiments may determine a shared set of feature values by comparing different feature values from the set of feature values and provide the shared set of feature values or the feature values determined for each message of the group of messages. Some embodiments may then determine one construct or a plurality of constructs by providing the shared set of feature values to a large language model. For example, some embodiments may provide the feature values of a set of 1,000 messages to a language model to generate a plurality of constructs. In some embodiments, for each respective construct of the plurality of constructs associated with a respective feature value, operations to apply the respective construct to text content will produce an indication whether the text content includes the respective feature value.

After generating a new construct to extract information from a message, some embodiments may store the new construct in one or more memory devices and use the new construct to obtain one or more identifiers. For example, some embodiments may store a newly generated construct in a long-term storage database of an on-premise server or a cloud computing service. Alternatively, or additionally, some embodiments may store a newly generated construct in a list of constructs accessible to an identifier detection application or function. After obtaining an additional message, such as an additional message provided by a client computing device, a transaction device, etc., some embodiments may match one or more constructs of the plurality of constructs with text of the additional message to determine the value or presence of one or more feature values. For example, some embodiments may generate or otherwise determine a feature value equal to "3" to represent the number of delimited elements and generate a regular expression by providing the feature value to a trained language model, where an output or a portion of an output of the trained language model is "[A-Za-z]+//+[A-Za-z]+//+[A-Za-z]+." Some embodiments may then use the generated regular expression to determine whether the feature value of the additional message representing a count of delimited elements is also equal to "3."

Furthermore, some embodiments may generate a third construct after generating the new construct. Some embodiments may even use the third construct to obtain a platform identifier or other information of a message without using a first construct, where the first construct may have previously been used to obtain platform identifier information or other information from previously received messages. For example, some embodiments may generate a first construct by providing a first set of messages to a first large language model and generate a second construct by providing a shared set of feature values derived from the first set of messages to a second large language model. Some embodiments may then detect a match between a second set of messages and the second construct without using the first construct and, in response to the detected match, provide the second set of messages to the first large language model to generate a third construct. Some embodiments may perform this matching operation using the second construct in lieu of performing a query search or in combination with performing a query search. Such operations may help when a message structure is adopted by different organizations that do not share a common identifier.

Some embodiments may perform additional training operations based on indications that a generated construct does not accurately provide one or more target identifiers that the construct is associated with. For example, some embodiments may generate a first construct using a language model and apply the first construct to a set of messages. In some embodiments, a user or an automated system may provide an indication that applying the first construct to the set of messages has provided an incorrect identifier or did not provide any identifier at all. In response, some embodiments may update the language model by adding the first construct to a training dataset for use as a training message. The training message may be associated with an indication of failure such that a training of the language based on the training dataset will reduce the likelihood of the language model generating the first construct.

Some embodiments may obtain an additional set of messages, as indicated by block 340. Some embodiments may receive a second set of incoming messages, from one or more client computing devices, other computing devices, transaction devices, or other devices. Some embodiments may obtain additional messages at a later time than a first set of messages used to generate a construct. For example, some embodiments may obtain a first set of messages on January 1, 20ZZ, and use a subset of the first set of messages to generate a construct using operations described in this disclosure. Some embodiments may then obtain an additional set of messages on January 1, 20ZZ. Alternatively, or additionally, the additional messages may be obtained from a database of messages, where one or more of the additional messages may have been generated before the first set of messages used to generate a construct. Furthermore, some embodiments may obtain messages using operations in a manner similar to or the same as those described for block 304.

Some embodiments may extract additional text from an additional set of messages with the second construct, as indicated by block 344. Some embodiments may extract additional text using the second construct by matching a text portion of the additional text with a text-matching pattern of the second construct. Furthermore, some embodiments may execute program code encoded in the second construct when performing a text-matching operation. Some embodiments may then determine whether the matched text portion matches with a target identifier associated with the second construct or the labeled set of messages used to generate the second construct.

Some embodiments determine an additional labeled set of messages by detecting matches between the target identifier and the additional text, as indicated by block 350. For example, some embodiments may provide a set of messages originating from a set of transaction devices to a language model to generate the construct "(delimit.(";").(3))=>^[0-3][0-9][5-9][A-Z]$\{\{-T\}\}[2]," which includes a combination of program code and a regular expression to segment a text statement by using ";" as a delimiter, and then apply the regular expression to the third element. It should be understood that a generated construct may include some other combination of program code and regular expressions or other text-matching patterns. Some embodiments may then receive a new set of labeled messages from the same or a different set of transaction devices. After applying the construct, some embodiments may detect the identifier "129C" based on the text content of a set of messages by using a large language model and use the construct to retrieve the identifier from the text content.

Some embodiments may perform operations to determine whether a generated construct labeled with or otherwise associated with a first identifier can be generalized such that the generated construct can be used to obtain identifiers for other types of messages. For example, after generating a construct based on a first set of messages indicating a first identifier, some embodiments may obtain a second set of messages that are not labeled with the first identifier but are instead labeled or otherwise associated with a second identifier. Some embodiments may then determine whether the generated construct matches with the second identifier of the second labeled set of messages. For example, some embodiments may determine whether a construct used to extract the identifier "blueID123" is also usable to extract the known different identifier "redID123." Some embodiments may receive confirmation that a construct matches with the second identifier of the second labeled set of messages from a user, from a training dataset of known identifiers and training messages, or by using a query to retrieve information from a database indicating that "redID123" is a known different identifier. In response to a determination that a generated construct matches with or otherwise isolates a known different identifier of the second labeled set of messages, some embodiments may associate the generated construct with the known different identifier in a database or other data structure used to store identifiers. For example, after performing such operations, some embodiments may retrieve the generated construct using a query indicating the known different identifier based on the association between the known different identifier and the generated construct.

Some embodiments may use a newly generated construct or set of identifier-capturing program code to detect whether the generated construct or set of identifier-capturing program code provides correct identifiers when applied to a dataset of messages. For example, some embodiments may retrieve a text segment of a message of a set of messages, where the message was not initially considered to be one of the messages associated with a target label. Some embodiments may then use the generated construct to detect a match with a text segment. In response to a detection that the text segment matches with the second construct, some embodiments may then update the labeled set of messages to include the newly labeled message.

Some embodiments may then update a database based on the additional labeled set of messages, as indicated by block 354. For example, some embodiments may detect matches between a target identifier and text extracted from the additional labeled set of messages by using a newly generated construct. Some embodiments may then update a database storing the labeled set of messages with the additional labeled set of messages, such as by adding a new set of records that include text content of the additional labeled set of messages.

Some embodiments may deprecate the use of an old construct that is determined to no longer capture an identifier. For example, some embodiments may determine that using a previously used construct to obtain an identifier from a message does not match with, isolate, or otherwise provide a known identifier associated with a message. In response, some embodiments may remove the previously used construct from a list of constructs to be applied to incoming messages to detect identifiers of the incoming messages. By removing the old construct, some embodiments may reduce the computational expense of identification operations or related data extraction operations by removing a construct that no longer isolates an identifier that it is meant to isolate. Alternatively, some embodiments may test the first construct for a duration to determine whether the first construct does correctly isolate any identifiers that are not isolated by the second construct and, in response, keep both the first and second constructs in a list of constructs to be applied to a set of messages.

The operations of each method presented in this disclosure are intended to be illustrative and non-limiting. It is contemplated that the operations or descriptions of FIG. 3 may be used with any other embodiment of this disclosure. In addition, the operations and descriptions described in relation to FIG. 3 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated is not intended to be limiting. In some embodiments, a client device may directly perform one or more operations described in this disclosure as being performed by a server or other computing system.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise.

Furthermore, a "set" may refer to a singular form or a plural form, such that a "set of items" may refer to one item or a plurality of items.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods. For example, it should be noted that one or more of the devices or equipment discussed in relation to FIGS. 1-2 could be used to perform one or more of the operations described in relation to FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 or FIG. 2 may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include a relational database such as a PostgreSQL™ database or MySQL database. Alternatively, or additionally, the set of databases or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some or all of the functionality attributed herein to one of subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated record.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

The present techniques will be better understood with reference to the following enumerated embodiments:

1. A method comprising: obtaining a first set of messages comprising a set of identifiers; determining a labeled set of messages associated with a target identifier of the set of identifiers by filtering the first set of messages with a first construct to detect matches between the target identifier and text extracted from the first set of messages with the first construct; calculating a set of characterizing values associated with the target identifier based on the labeled set of messages and the first set of messages; determining whether the set of characterizing values satisfies a set of criteria; based on a result indicating that the set of characterizing values satisfies the set of criteria, performing a search for the target identifier in a database of messages to retrieve a set of matching messages; providing the set of matching messages as inputs to a language model to generate a second construct; and storing the second construct in one or more memory.

2. A method comprising: obtaining a series of incoming messages comprising identifiers corresponding with different platforms, wherein the identifiers comprises a target identifier associated with a target platform; determining a labeled set of incoming messages associated with the target identifier by filtering the series of incoming messages with an initial construct to detect matches between the target identifier and text segments of the series of incoming messages extracted with the initial construct; calculating a characterizing value associated with the target identifier correlated with a proportion representing a count of the labeled set of incoming messages in comparison to a count of the series of incoming messages; determining whether the characterizing value satisfies a set of criteria indicating a significant change in identifier composition; based on a determination that the characterizing value satisfies the set of criteria, retrieving a set of matching messages in a database of messages by performing a search for the target identifier in the database of messages; providing the set of matching messages as inputs to a trained language model to generate a new construct; and updating the labeled set of incoming messages associated with the target identifier by detecting matches between the target identifier and text extracted from an additional series of incoming messages by the new construct.

3. A method comprising: obtaining a first set of messages comprising a set of identifiers; determining a labeled set of messages associated with a target identifier of the set of identifiers by filtering the first set of messages with a first construct to detect matches between the target identifier and text extracted from the first set of messages with the first construct; calculating a characterizing value associated with the target identifier based on a count of the labeled set of messages and a count of the first set of messages; determining whether the characterizing value satisfies a set of criteria; based on a result indicating that the characterizing value satisfies the set of criteria, performing a search for the target identifier in a database of messages to retrieve a set of matching messages; providing the set of matching messages as inputs to a language model to generate a second construct; extracting additional text from an additional set of messages with the second construct; and updating the labeled set of messages by detecting matches between the target identifier and the additional text.

4. The method of any of embodiments 1 to 3, further comprising: determining a set of feature values associated with the target identifier based on the labeled set of messages by, for each respective message of the labeled set of messages, determining a respective set of feature values; determining a plurality of constructs by providing the set of feature values to a large language model; and associating the plurality of constructs with the target identifier in a data structure storing identifiers.

5. The method of embodiment 4, further comprising: obtaining an additional message; matching the plurality of constructs with text of the additional message without matching the second construct with the text of the additional message; and providing the text of the additional message to the language model to generate a third construct.

6. The method of any of embodiments 1 to 5, wherein using the first construct comprises: retrieving a text segment of a first message of the first set of messages; detecting that the text segment matches with the second construct; and in response to a detection that the text segment matches with the second construct, updating the labeled set of messages with the first message.

7. The method of any of embodiments 1 to 6, further comprising: retrieving a dataset of previous characterizing values associated with the target identifier; determining a range of characterizing values based on the dataset of previous characterizing values, wherein determining whether the characterizing value satisfies the set of criteria comprises determining whether the characterizing value is within the range of characterizing values.

8. The method of any of embodiments 1 to 7, wherein the labeled set of messages is a first labeled set of messages, further comprising: obtaining a second labeled set of messages associated with a second identifier; determining whether the second construct matches with the second identifier of the second labeled set of messages; and in response to a determination that the second construct matches with the second identifier of the second labeled set of messages, associating the second construct with the second identifier in a data structure storing identifiers.

9. The method of any of embodiments 1 to 8, further comprising training the language model with a training dataset comprising regular expressions and training messages associated with the regular expressions.

10. The method of any of embodiments 1 to 9, wherein updating the labeled set of messages comprises not detecting matches between the first construct and the additional set of messages.

11. The method of any of embodiments 1 to 10, wherein determining the labeled set of messages comprises: determining a set of matching text by applying a plurality of constructs to the labeled set of messages, wherein the plurality of constructs comprises the first construct, wherein the set of matching text comprises the target identifier.

12. The method of any of embodiments 1 to 11, the operations further comprising determining a minimum count threshold based on a history of previous counts of labeled messages, wherein: the set of characterizing values comprises a count of the labeled set of messages; and determining whether the set of characterizing values satisfies the set of criteria comprises determining whether the count of the labeled set of messages is less than the minimum count threshold.

13. The method of any of embodiments 1 to 12, wherein: each message of the first set of messages comprises a quantitative value; determining a summation based on quantitative values of the labeled set of messages; determining whether the set of characterizing values satisfies the set of criteria comprises determining whether the summation is less than a summation threshold.

14. The method of any of embodiments 1 to 13, wherein: determining the set of characterizing values comprises determining a rate of change in a count of the labeled set of messages over a duration; and determining whether the set of characterizing values satisfies the set of criteria comprises determining whether the rate of change is greater than a rate threshold.

15. The method of any of embodiments 1 to 14, the operations further comprising: receiving an additional message; retrieving a third construct different from the first construct or the second construct; obtaining a matched text portion by detecting a match between the third construct and text of the additional message; determining whether the matched text portion matches with the target identifier; and in response to a determination that the matched text portion matches with the target identifier, updating the labeled set of messages based on the additional message.

16. The method of any of embodiments 1 to 15, the operations further comprising: retrieving a text segment of a first message of the first set of messages; detecting that the text segment matches with the second construct; and in response to a detection that the text segment matches with the second construct, updating the labeled set of messages with the first message.

17. The method of any of embodiments 1 to 16, the operations further comprising: retrieving a dataset of previous characterizing values associated with the target identifier; determining a range of characterizing values based on the dataset of previous characterizing values; and determining a threshold boundary based on the range of characterizing values, wherein determining whether the set of characterizing values satisfies the set of criteria comprises determining whether at least one characterizing value of the set of characterizing values is within the threshold boundary.

18. The method of any of embodiments 1 to 17, the operations further comprising: generating a query based on the target identifier; sending the query to a database of entity records; and updating an entity record of the database of entity records to associate the second construct with the entity record.

19. The method of any of embodiments 1 to 18, further comprising: receiving an indication that the second construct did not detect an additional message comprising the target identifier; and updating the language model based on a training dataset comprising the additional message.

20. The method of any of embodiments 1 to 19, wherein: filtering the first set of messages with the first construct comprises filtering the first set of messages with a plurality of constructs; the plurality of constructs comprises the first construct; and the operations further comprise: determining whether the first construct isolates text of the first set of messages that is not isolated by the second construct; and removing the first construct from the plurality of constructs based on a determination that the first construct does not isolate text of the first set of messages that is not isolated by the second construct.

21. One or more tangible, non-transitory, machine-readable media storing instructions that, when executed by a set of processors, cause the set of processors to effectuate operations comprising those of any of embodiments 1 to 20.

22. A system comprising: a set of processors and a set of media storing computer program instructions that, when executed by the set of processors, cause the set of processors to effectuate operations comprising those of any of embodiments 1 to 20.

What is claimed is:

1. A system for facilitating dynamic detection of electronic messages corresponding to a target via model generation of identifier detection constructs triggered by incoming message structure drift over time, the system comprising one or more processors and one or more media storing program instructions that, when executed by the one or more processors, cause the one or more processors to perform operations comprising:

in connection with a series of at least 10,000 incoming electronic messages, comprising identifiers corresponding with different platforms, that are obtained during a day, executing prestored construct program code associated with a target identifier of the identifiers on the series of at least 10,000 incoming electronic messages, wherein text segments matching the target identifier are extracted from the executing of the prestored construct program code to detect matching electronic messages corresponding to a match between the target identifier and the extracted text segments;

in response to an identifier composition change threshold being satisfied by a target-identifier-associated characterizing value derived from a ratio of a count of the matching electronic messages and a count of the series of incoming electronic messages, inputting a set of matching electronic messages matching the target identifier into a large language model to generate new model-generated construct program code;

executing the new model-generated construct program code on an additional series of at least 10,000 incoming electronic messages, wherein additional text segments matching the target identifier are extracted from the executing of the new model-generated construct program code to detect additional matching electronic messages corresponding to a match between the target identifier and the extracted additional text segments; and storing, in an electronic database, an updated labeled set of electronic messages comprising the additional matching electronic messages and associated with the target identifier.

2. The system of claim 1, wherein the large language model comprises a transformer neural network trained on message-structured data and negative indications of constructs indicating a construct generation failure.

3. The system of claim 1, wherein the large language model combines outputs of multiple sub-models of the large language model, that are respectively trained on different message sources or platform types, to generate the new model-generated construct program code.

4. The system of claim 1, wherein executing the prestored construct program code associated with the target identifier comprises executing the prestored construct program code to apply a plurality of constructs to the series of at least 10,0000 incoming electronic messages, the executing of the prestored construct program code extracting matching text segments that each match the target identifier despite at least one of the matching text segments being extracted using a first construct and at least another one of the matching text segments being extracted using a second construct different from the first construct.

5. A method comprising:

in connection with a first set of incoming electronic messages comprising identifiers corresponding with different platforms, executing first construct code associated with a target identifier of the identifiers on the first set of incoming electronic messages, wherein text segments matching the target identifier are extracted from the executing of the first construct code to detect matching electronic messages corresponding to a match between the target identifier and the extracted text segments;

based on an identifier composition change threshold being satisfied by a target-identifier-associated characterizing value derived from a ratio of a count of the matching electronic messages and a count of the first set of incoming electronic messages, inputting representations of a set of matching electronic messages corresponding to the target identifier into a machine learning model to generate second construct code;

executing the second construct code on a second set of incoming electronic messages, wherein additional text segments matching the target identifier are extracted from the executing of the second construct code to detect additional matching electronic messages corresponding to a match between the target identifier and the extracted additional text segments; and storing, in an electronic database, an updated labeled set of electronic messages comprising the additional matching electronic messages and associated with the target identifier.

6. The method of claim 5, wherein the machine learning model comprises a language model including a transformer neural network trained on message-structured data and negative indications of constructs indicating a construct generation failure.

7. The method of claim 5, wherein the identifier composition change threshold comprises a rate-of-change value indicating a difference between (i) the ratio of the count of the matching electronic messages and the count of the first set of incoming electronic messages and (ii) a prior ratio associated with the target identifier.

8. The method of claim 5, wherein the machine learning model combines outputs of multiple sub-models of the machine learning model, that are respectively trained on different message sources or platform types, to generate the second construct code.

9. The method of claim 5, wherein the identifier composition change threshold is satisfied when the ratio of the count of the matching electronic messages to the count of the first set of incoming electronic messages is less than a predefined threshold value.

10. The method of claim 5, wherein the second construct code comprises tokenizing code configured to tokenize content of the second set of incoming electronic messages prior to detecting matches between the target identifier and the extracted additional text.

11. The method of claim 5, further comprising training the machine learning model with a training dataset comprising regular expressions and training messages associated with the regular expressions.

12. The method of claim 5, wherein executing the first construct code associated with the target identifier comprises executing the first construct code to apply a plurality of constructs to the first set of incoming electronic messages, the executing of the first construct code extracting matching text segments that each match the target identifier despite at least one of the matching text segments being extracted using a first construct and at least another one of the matching text segments being extracted using a second construct different from the first construct.

13. One or more non-transitory machine-readable media storing instructions that, when executed by one or more processors, perform operations comprising:

in connection with a first set of incoming electronic messages comprising identifiers corresponding with different platforms, executing first construct code associated with a target identifier of the identifiers on the first set of incoming electronic messages, wherein text segments matching the target identifier are extracted from the executing of the first construct code to detect matching electronic messages corresponding to a match between the target identifier and the extracted text segments;

based on an identifier composition change threshold being satisfied by a target-identifier-associated characterizing value derived from a ratio of a count of the matching electronic messages and a count of the first set of incoming electronic messages, inputting representations of a set of matching electronic messages corresponding to the target identifier into a machine learning model to generate second construct code;

executing the second construct code on a second set of incoming electronic messages, wherein additional text segments matching the target identifier are extracted from the executing of the second construct code to detect additional matching electronic messages corresponding to a match between the target identifier and the extracted additional text segments; and storing, in an electronic database, an updated labeled set of electronic messages comprising the additional matching electronic messages and associated with the target identifier.

14. The one or more non-transitory machine-readable media of claim 13, wherein the machine learning model comprises a language model including a transformer neural network trained on message-structured data and negative indications of constructs indicating a construct generation failure.

15. The one or more non-transitory machine-readable media of claim 13, wherein the identifier composition change threshold comprises a rate-of-change value indicating a difference between (i) the ratio of the count of the matching electronic messages and the count of the first set of incoming electronic messages and (ii) a prior ratio associated with the target identifier.

16. The one or more non-transitory machine-readable media of claim 13, wherein the machine learning model combines outputs of multiple sub-models of the machine learning model, that are respectively trained on different message sources or platform types, to generate the second construct code.

17. The one or more non-transitory machine-readable media of claim 13, wherein the identifier composition change threshold is satisfied when the ratio of the count of the matching electronic messages to the count of the first set of incoming electronic messages is less than a predefined threshold value.

18. The one or more non-transitory machine-readable media of claim 13, wherein the second construct code comprises tokenizing code configured to tokenize content of the second set of incoming electronic messages prior to detecting matches between the target identifier and the extracted additional text.

19. The one or more non-transitory machine-readable media of claim 13, further comprising training the machine learning model with a training dataset comprising regular expressions and training messages associated with the regular expressions.

20. The one or more non-transitory machine-readable media of claim 13, wherein executing the first construct code associated with the target identifier comprises executing the first construct code to apply a plurality of constructs to the first set of incoming electronic messages, the executing of the first construct code extracting matching text segments that each match the target identifier despite at least one of the matching text segments being extracted using a first construct and at least another one of the matching text segments being extracted using a second construct different from the first construct.

* * * * *